(12) United States Patent
Bauchot et al.

(10) Patent No.: US 8,756,409 B2
(45) Date of Patent: Jun. 17, 2014

(54) SYSTEM, METHOD AND COMPUTER PROGRAM PRODUCT FOR RETRIEVING DATA AT BOOT TIME

(75) Inventors: Frederic Bauchot, Saint-Jeannet (FR); Joaquin Picon, St. Laurent du Var (FR); Vincent Tassy, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 13/156,447

(22) Filed: Jun. 9, 2011

(65) Prior Publication Data

US 2012/0096254 A1 Apr. 19, 2012

(30) Foreign Application Priority Data

Oct. 13, 2010 (EP) ..................... 10306110

(51) Int. Cl.
*G06F 9/24* (2006.01)
(52) U.S. Cl.
USPC .................... 713/2; 713/1; 713/100; 713/182
(58) Field of Classification Search
USPC ........................................ 713/1, 2, 100, 182
See application file for complete search history.

(56) References Cited

U.S. PATENT DOCUMENTS

| | | | |
|---|---|---|---|
| 6,373,498 B1* | 4/2002 | Abgrall | 345/619 |
| 7,636,839 B2 | 12/2009 | Lai et al. | |
| 8,261,051 B2* | 9/2012 | Kuo et al. | 713/1 |
| 2004/0130557 A1* | 7/2004 | Lin et al. | 345/619 |
| 2008/0046613 A1* | 2/2008 | Lai et al. | 710/58 |
| 2008/0046709 A1* | 2/2008 | Wang | 713/2 |
| 2010/0077192 A1 | 3/2010 | Kuo et al. | |
| 2010/0082965 A1* | 4/2010 | Tsuji et al. | 713/2 |

FOREIGN PATENT DOCUMENTS

CN 1752887 A 3/2006

OTHER PUBLICATIONS

CN Application No. 201110316699.9, Office Action Communication dated Nov. 12, 2013, 7 pages.

* cited by examiner

*Primary Examiner* — M Elamin
(74) *Attorney, Agent, or Firm* — Douglas A. Lashmit; Hoffman Warnick LLC

(57) ABSTRACT

The invention provides a system for retrieving at boot time user data stored on a computer. The computer comprises a processor coupled through a system bus to I/O devices and to a system memory, the computer further having a basic input output system (BIOS) unit operatively coupled to the system bus for loading a computer operating system during a computer boot procedure, wherein the system memory being accessible to the computer operating system via the system bus. The system comprises a boot adapter for connecting the system bus to a boot bus, a boot memory coupled to the boot bus wherein the boot memory comprises storage locations for storing the predefined user data, and program code means coupled to the BIOS unit. The program code means are operative for loading a boot operating system during the computer boot procedure, the boot operating system having instructions for accessing the boot memory during the computer boot procedure.

16 Claims, 4 Drawing Sheets

SYSTEM, METHOD AND COMPUTER PROGRAM PRODUCT FOR RETRIEVING DATA AT BOOT TIME

FIELD OF THE INVENTION

The present invention relates generally to the field of computer systems and, more particularly, to a system and method for retrieving data during boot (e.g., start-up) time.

RELATED ART

People handling portable devices such as mobile computers, PDA's, hand-held computers, or video devices may be required to prove ownership of their portable devices or of any software installed on the portable devices (e.g., proof of ownership to authorities, police forces, customs at airports, etc.). To accomplish this satisfactorily, it is often necessary that an individual keeps a printed and up-to-date copy of each formal paper, such as a certificate of ownership, a software product license, and so on. This can be a cumbersome task.

Storing a softcopy of each document in a storage memory location of a portable device is an alternative. However, when the individual is asked to show the documents to a requestor, the steps of waiting for the powering on of the portable device and the loading of an operating system prior to retrieving the stored documents is often a time consuming process.

SUMMARY OF THE INVENTION

Accordingly, the present invention provides a system and a method for retrieving predefined data at boot (e.g., start-up) time, and for efficiently using device resources.

Further aspects of the invention will now be described, by way of implementation and examples, with reference to the accompanying figures.

BRIEF DESCRIPTION OF THE DRAWINGS

The above and other items, features and advantages of the invention will be better understood by reading the following more particular description of the invention in conjunction with the figures.

DETAILED DESCRIPTION OF THE INVENTION

Embodiments of the invention are described hereinafter by way of examples with reference to the accompanying figures and drawings.

Figure 1:
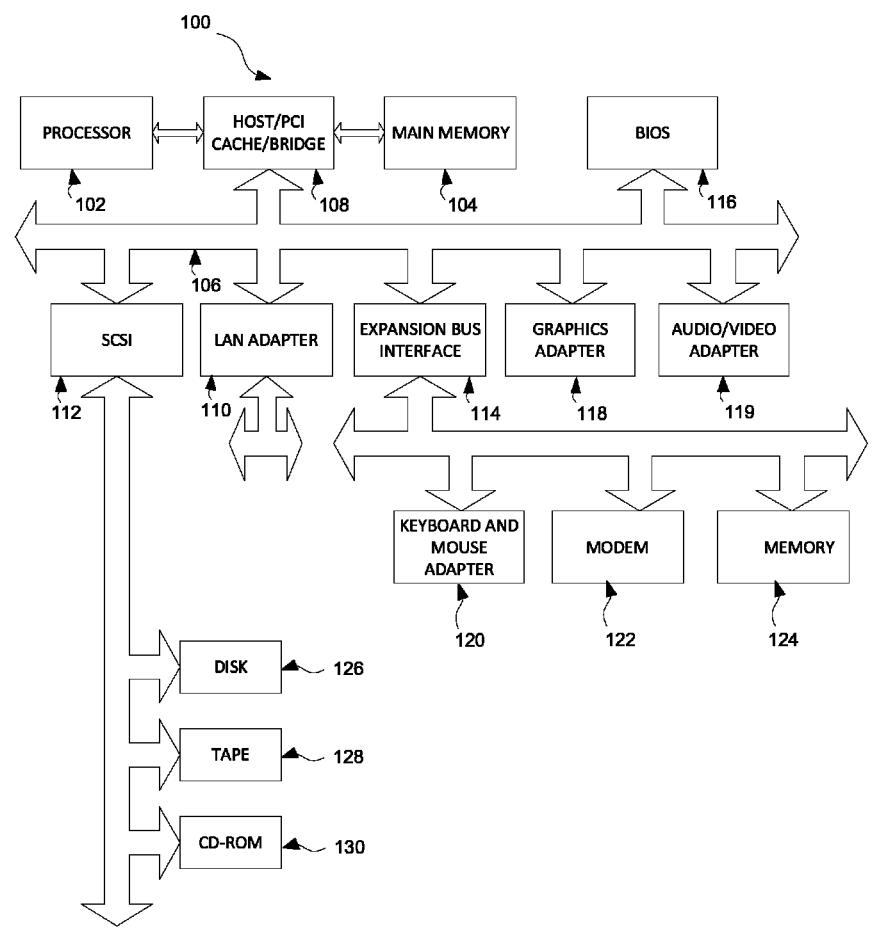
FIG. 1 depicts an data processing system having a BIOS.

With reference first to FIG. 1, a block diagram illustrating a data processing system is depicted. Data processing system 100 is an example of a data processing implementation for a portable computer. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection.

Basic input/output system (BIOS) unit 116 also is connected to PCI local bus 106. BIOS unit 116 is a nonvolatile memory, such as a flash memory in these examples, in which code or instructions for starting the data processing system 100 are located. The BIOS for data processing system 100 functions to ensure all the other hardware components, such as chips, hard drives, ports, and processor function together. BIOS software in BIOS unit 116 has a number of different roles, but one of the most important roles of the BIOS is to load the operating system. When the data processing system 100 is turned on and processor 102 tries to execute its first instruction, processor 102 has to obtain that instruction from somewhere. Processor 102 is unable to obtain the first instruction from the operating system because the operating system is located on a storage device, such as hard disk 126, and the BIOS provides processor 102 with instructions to tell the processor 102 where the operating system is located.

Further, the BIOS also includes other common tasks, such as for example, a power-on self-test (POST) for all of the different hardware components in the system to make sure the components are working properly; activating other components on different cards installed in the data processing system, such as those on a SCSI adapter and graphics cards; providing a set of low-level routines that the operating system uses to interface to different hardware devices, such as for example, the keyboard, display, serial ports, and parallel ports; and managing a collection of settings for components, such as hard disks and a system clock.

Graphics adapter 118 and audio/video adapter 119 are connected to PCI local bus 106 by add-in boards inserted into expansion slots. Expansion bus interface 114 provides a connection for a keyboard and mouse adapter 120, modem 122, and additional memory 124. Small computer system interface (SCSI) host bus adapter 112 provides a connection for hard disk drive 126, tape drive 128, and CD-ROM drive 130. Typical PCI local bus implementations will support three or four PCI expansion slots or add-in connectors.

An operating system runs on processor 102 and is used to coordinate and provide control of various components within data processing system 100. The operating system may be a commercially available operating system, such as Windows XP or later, which is available from Microsoft Corporation. Instructions for the operating system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash read-only memory (ROM), equivalent nonvolatile memory, or optical disk drives and/or the like, may be used in addition to or in place of the hardware depicted in FIG. 1.

Figure 2:
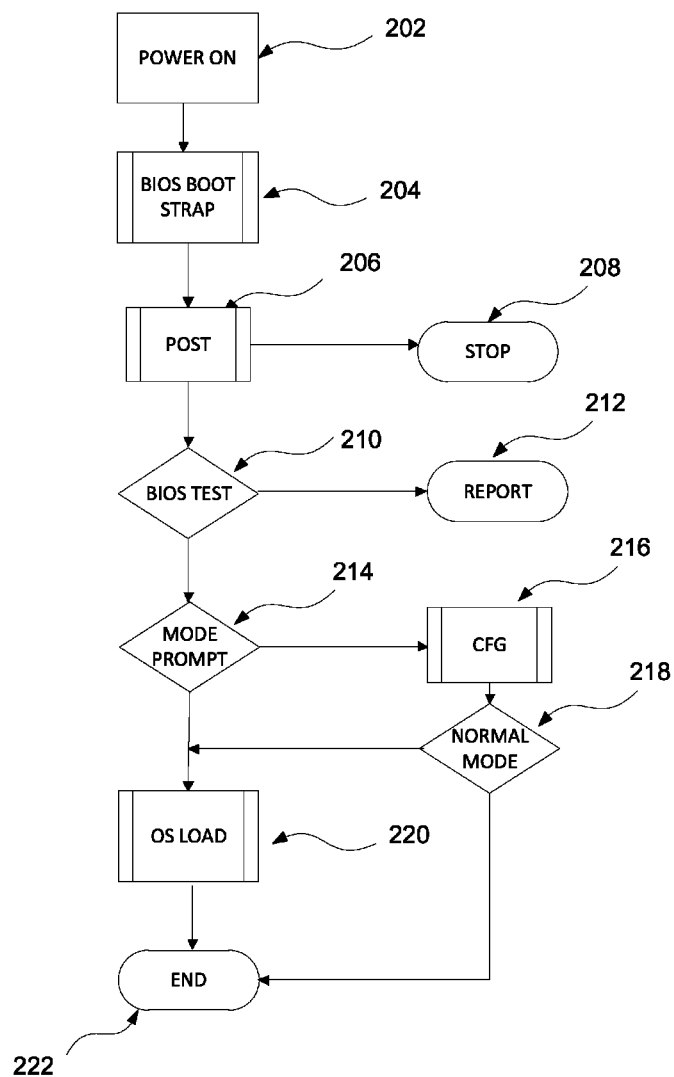
FIG. 2 is a flow chart of a system boot procedure.

Turning now to FIG. 2, a flow chart of a standard operating system boot procedure 200 is described. After the data processing system is powered-on at step 202, the processor starts the BIOS sequence at step 204 which begins with the so-called Power-On Self Test (POST) at step 206. The POST step checks for any hardware fatal errors, in which case the process stops at step 208, otherwise the boot procedure continues at step 210. At next step 210, the BIOS sequence performs several tests on the data processing system and reports error messages for any error at step 212. During this step 210, the BIOS looks for a video card and other devices. More tests are performed to determine what hardware components are installed in the data processing system. For example, if the BIOS supports a Plug and Play standard, it is configured at this time. Hard drive parameters and access mode are also set at this step. At the end of the test sequence 210, the BIOS continues at step 214, where the system may enter in a configuration mode (CFG). In case the user agrees on the system prompt to enter the configuration mode, the process goes to step 216 where the configuration software is loaded and executed. At the end of the configuration mode, the process checks if the normal mode can be entered at step 218. If it is the case, then the system reverts to the normal BIOS procedure to enter step 220, otherwise the system terminates and ends at step 222. At step 220, the system starts loading the operating system of the data processing system from a boot device to finally end the boot procedure at last step 222.

Those of ordinary skill in the art will appreciate that not all tests performed during step 210 are detailed herein.

Figure 3:
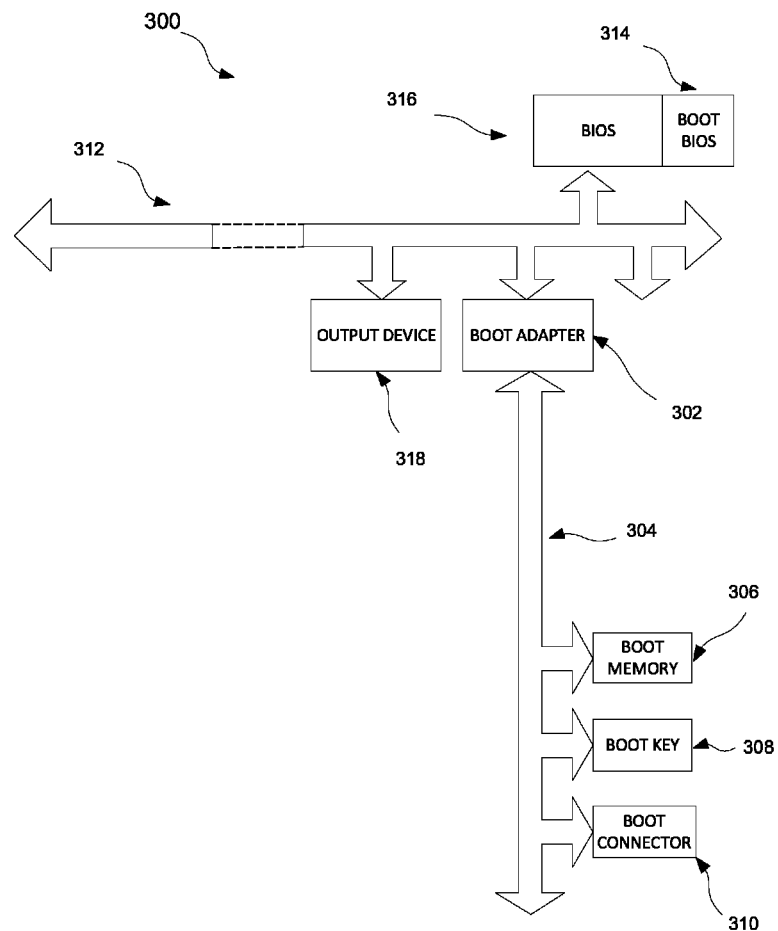
FIG. 3 details an illustrative data processing system according to an embodiment of the invention.

Referring now to FIG. 3, a data processing system 300 according to an illustrative embodiment of the invention is shown. It should be noted that in FIG. 3 the components shown and described with reference to FIG. 1 that are not directly relevant to the present invention have been omitted for clarity and brevity.

A boot adapter 302 comprises bus interface logic to allow communication between system bus 312 and a boot bus 304. A boot memory storage device 306 is coupled to boot bus 304. Boot memory storage device 306 stores user data that is to be retrieved during the system boot procedure. User data, in an implementation of the invention are files containing information related to the computer authentication or ownership, including hardware to software information. During the boot data retrieval process as further described with reference to FIG. 4, boot memory storage device 306 is read and memory content is output. The information may be transmitted over boot bus 304 to an output device 318 coupled to system bus 312. Output device 318 may be one of the I/O devices of the computer, for example, a display or a removable device that is inserted in a boot connector 310. Such a removable device may later be inserted in a remote computer to be read from the latter.

In an alternate embodiment of the present invention, the data stored on the data processing system 300 may be encrypted when stored on the boot memory using a private key. A boot key device 308 coupled to boot bus 304 records the public key used to decipher the encrypted information.

System BIOS unit 316 is coupled to a boot BIOS unit 314. Boot BIOS unit 314 contains program code for loading a boot operating system during the boot procedure of the data processing system 300 and launching a data retrieval process for providing the data retrieved on an output device 318.

The depicted example in FIG. 3 is not meant to imply architectural limitations. For example, the data processing system 300 may be a desktop computer, a notebook computer, a hand-held computer, a PDA, smartphone, etc. Additionally, other peripheral devices, such as optical disk drives and the like, also may be used in addition to or in place of the hardware depicted. Also, the processes of the present invention may be applied to a multiprocessor data processing system.

The present invention provides an improved method, apparatus, and computer instructions for storing and retrieving data stored on a data processing system.

More specifically, the mechanism of the data processing system is implemented in the software or code that is used to first start the data processing system. In the example, that code is the BIOS. The resulting process is independent of the operating system that is eventually run on the data processing system. When the BIOS is launched or executed during the booting of the data processing system, a data retrieval process may be launched to obtain automatically the authentication papers attached to or associated with the data processing system and/or software installed thereon, all with the use of a set of minimal computing resources.

Figure 4:
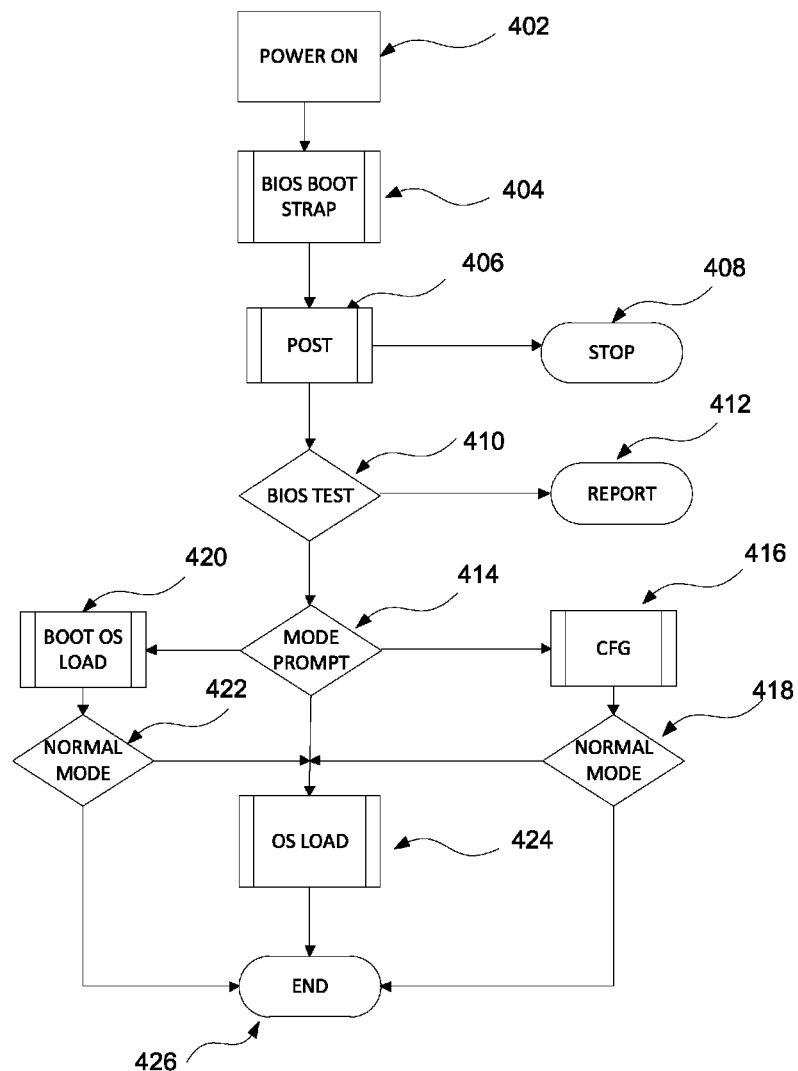
FIG. 4 is an illustrative flow chart of a boot procedure according to an embodiment of the invention.

Turning next to FIG. 4, a flow chart of a boot procedure according to an embodiment of the invention is described. After the data processing system is powered-on at step 402, the processor starts the BIOS sequence at step 404 with a Power-On SelfTest (POST) at step 406. As already described, the POST step checks for any hardware fatal errors, in which case the process stops at step 408, otherwise the boot procedure continues at step 410. At step 410, the BIOS sequence performs several tests on the computer system and reports error messages for any error at step 412. At the end of the BIOS test sequence 410, the BIOS continues at step 414, where the system may offer, for example, through a user BIOS interface, to enter into either a configuration mode (CFG), a normal load mode, or a data retrieval mode. In case the user agrees on the system prompt to enter the configuration mode, the process goes to step 416 where the configuration software is loaded and executed as previously explained at step 216 of FIG. 2. At the end of the configuration mode, the process checks if the normal mode can be entered at step 418. If it is the case, then the system reverts to the normal BIOS procedure to enter step 424, otherwise the system terminates and ends at step 426.

Going back to step 414, if the user agrees to enter the normal load mode, the process goes to step 424 and follows steps as previously described at step 220 (FIG. 2).

Again going back to step 414, if the user agrees to enter the data retrieval mode, the process goes to step 420. At step 420, the system starts loading a boot operating system (OS). The boot OS is a basic operating system that is limited, but sufficient to launch the functionalities allowing access to the boot memory, to obtain the required data from the boot memory, to encrypt/decrypt data, and to output the data on an output device.

At the end of the data retrieved step 420, the process checks if the normal mode can be entered at step 422. If it is the case, then the system reverts to the normal BIOS procedure to enter step 424, otherwise the system terminates and ends at step 426.

It is to be appreciated that an initial process not shown nor described herein allows a user to enter by any usual means the necessary documents in the dedicated boot memory assigned for storing the required predefined information. A user is capable of inputting data through a keyboard or OCR for example and outputting the data via a display device.

Additionally, an encryption operation may also take advantage of the present invention. The control documents may be encrypted by an authority issuing those latter using a private key. The encrypted document stored in the boot memory may be retrieved using a public key stored in the boot key device and also known by the authority requesting the data.

The present invention can take the form of an entirely hardware embodiment, an entirely software embodiment or an embodiment containing both hardware and software elements. In an embodiment, the invention is implemented in software, which includes but is not limited to firmware, resident software, microcode, etc.

Furthermore, the invention can take the form of a computer program product accessible from a computer-usable or computer-readable medium providing program code for use by, or in connection with a computer or any instruction execution system. For the purposes of this description, a computer-usable or computer-readable medium can be any tangible apparatus that can contain, store, communicate, propagate, or transport the program for use by, or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

It has to be appreciated that while the invention has been particularly shown and described with reference to at least one embodiment to determine a temporal view of a plurality of resources, various changes in form and detail may be made therein without departing from the spirit, and scope of the invention.

The invention claimed is:

1. A system for retrieving at boot time encrypted data stored on a computer, the computer having a processor coupled through a system bus to I/O devices and to a system memory, the computer further having a basic input output system (BIOS) unit operatively coupled to the system bus for loading a computer operating system during a computer boot procedure, the system memory being accessible to the computer operating system via the system bus, the system comprising:
   a boot adapter, comprising interface logic, for connecting the system bus to a separate boot bus, the boot adapter for allowing communication between the system bus and the boot bus;
   a boot memory coupled to the boot bus, the boot memory comprising storage locations for storing the encrypted data;
   a boot connector coupled to the boot bus;
   a display coupled to the boot connector;
   a boot key device connected to the boot bus for storing a public key; and
   a boot BIOS, separate from the BIOS unit, for loading a boot operating system during the computer boot procedure, the boot operating system having instructions for accessing the boot memory via the boot bus during the computer boot procedure, for decrypting the encrypted data stored in the boot memory using the public key stored in the boot key device, and for displaying the decrypted data on the display coupled to the boot connector.

2. The system of claim 1, wherein the boot operating system is launched in lieu of the computer operating system.

3. The system of claim 1, wherein the boot operating system is launched before launching the computer operating system.

4. The system of claim 1, further comprising a BIOS user interface for allowing a user to request launching the boot operating system during the computer boot procedure.

5. The system of claim 1, further comprising:
   a system for outputting the data from the boot memory to one of the I/O devices.

6. The system of claim 1, wherein the computer is a mobile computer.

7. The system of claim 1, further comprising:
   a system for writing the data into the boot memory.

8. The system of claim 7, wherein the writing system is operable with the computer operating system.

9. A method for retrieving at boot time encrypted data stored on a computer, the computer having a processor coupled through a system bus to I/O devices and to a system memory, the computer further having a basic input output system (BIOS) unit operatively coupled to the system bus for loading a computer operating system during a computer boot procedure, the system memory being accessible to the computer operating system via the system bus, the method comprising:
   storing the encrypted data in a boot memory, wherein the boot memory is coupled to a boot bus that is separate from the system bus, and wherein the boot bus is connected to the system bus by a boot adaptor comprising interface logic, the boot adapter allowing communication between the system bus and the boot bus;
   connecting a display to the boot bus using a boot connector;
   connecting a boot key device to the boot bus and storing a public key in the boot key device; and
   loading, by the processor, a boot operating system from a boot BIOS separate from the BIOS unit during the computer boot procedure, the boot operating system having instructions for accessing the boot memory via the boot bus during the computer boot procedure, for decrypting the encrypted data stored in the boot memory using the public key stored in the boot key device, and for displaying the decrypted data on the display coupled to the boot connector; and
   executing, by the processor, the boot operating system.

10. The method of claim 9, wherein the boot operating system is launched in lieu of the computer operating system.

11. The method of claim 9, wherein the boot operating system is launched before launching the computer operating system.

12. The method of claim 9, further comprising:
   allowing a user to request, via a BIOS user interface, launching of the boot operating system during the computer boot procedure.

13. The method of claim 9, further comprising:
   outputting the data from the boot memory to one of the I/O devices.

14. The method of claim 9, wherein the computer is a mobile computer.

15. The method of claim 9, further comprising:
   writing the data into the boot memory.

16. A non-transitory computer readable medium having a computer program stored thereon, which when executed, performs a method for retrieving at boot time encrypted data stored on a computer, the computer having a processor coupled through a system bus to I/O devices and to a system memory, the computer further having a basic input output system (BIOS) unit operatively coupled to the system bus for loading a computer operating system during a computer boot procedure, the system memory being accessible to the computer operating system via the system bus, the method comprising:

storing the encrypted data in a boot memory, wherein the boot memory is coupled to a boot bus that is separate from the system bus, and wherein the boot bus is connected to the system bus by a boot adaptor comprising interface logic, the boot adapter allowing communication between the system bus and the boot bus;

connecting a display to the boot bus using a boot connector;

connecting a boot key device to the boot bus and storing a public key in the boot key device; and loading a boot operating system from a boot BIOS separate from and coupled to the BIOS unit during the computer boot procedure, the boot operating system having instructions for accessing the boot memory via the boot bus during the computer boot procedure, for decrypting the encrypted data stored in the boot memory using the public key stored in the boot key device, and for displaying the decrypted data on the display coupled to the boot connector.

\* \* \* \* \*